(12) United States Patent
Kaiwa et al.

(10) Patent No.: US 12,173,673 B2
(45) Date of Patent: Dec. 24, 2024

(54) INTAKE NOISE REDUCTION STRUCTURE FOR VEHICLE

(71) Applicant: ISUZU MOTORS LIMITED, Tokyo (JP)

(72) Inventors: Naohiro Kaiwa, Kanagawa (JP); Jun Okura, Kanagawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 353 days.

(21) Appl. No.: 17/794,815

(22) PCT Filed: Jan. 21, 2021

(86) PCT No.: PCT/JP2021/001934
§ 371 (c)(1),
(2) Date: Jul. 22, 2022

(87) PCT Pub. No.: WO2021/149746
PCT Pub. Date: Jul. 29, 2021

(65) Prior Publication Data
US 2023/0053401 A1 Feb. 23, 2023

(30) Foreign Application Priority Data
Jan. 24, 2020 (JP) .................... 2020-009792

(51) Int. Cl.
*F02M 35/12* (2006.01)
*B62D 24/00* (2006.01)
(Continued)

(52) U.S. Cl.
CPC ......... *F02M 35/1283* (2013.01); *B62D 24/00* (2013.01); *B62D 33/067* (2013.01); *F02M 35/1255* (2013.01); *F02M 35/164* (2013.01)

(58) Field of Classification Search
CPC ...... B62D 24/00; B62D 33/067; B62D 33/06; B60K 13/02; B60K 13/00; F02M 35/164;
(Continued)

(56) References Cited

U.S. PATENT DOCUMENTS

| | | | | |
|---|---|---|---|---|
| 4,984,350 A | * | 1/1991 | Hayashi | F02M 35/1255 29/428 |
| 5,908,017 A | * | 6/1999 | Kaneko | F02M 35/12 123/195 A |

(Continued)

FOREIGN PATENT DOCUMENTS

| | | |
|---|---|---|
| JP | S59-083123 A | 6/1984 |
| JP | H02-037256 A | 3/1990 |

(Continued)

OTHER PUBLICATIONS

Patent Cooperation Treaty, International Search Report, Application No. PCT/JP2021/001934, dated Apr. 1, 2021, in 6 pages.
(Continued)

*Primary Examiner* — James M Dolak
(74) *Attorney, Agent, or Firm* — PROCOPIO, CORY, HARGREAVES & SAVITCH LLP

(57) ABSTRACT

A bracket 10 has a U-shaped cross section in which a pair of facing plate portions 15 extend from both side edges of a bottom plate portion 12 so as to face each other, and is fixed to a vehicle body side for mounting a predetermined component. The bottom plate portion 12 and the pair of facing plate portions 15 partition a bracket inner space 16, and the bottom plate portion 12 is provided with a through hole 20 which makes the bracket inner space 16 communicate with an outside. A resonator 23 is fixed to the bracket 10 in a state where the resonator 23 is accommodated in the bracket inner
(Continued)

space 16. A ventilation passage 29 makes the resonator 23 communicate with the intake duct 21 through the through hole 20.

2 Claims, 4 Drawing Sheets

(51) Int. Cl.
*B62D 33/067* (2006.01)
*F02M 35/16* (2006.01)

(58) Field of Classification Search
CPC ............... F02M 35/00; F02M 35/1283; F02M 35/1255; F02M 35/16; F02M 35/12; F02M 35/14; F02M 35/1288
See application file for complete search history.

(56) References Cited

U.S. PATENT DOCUMENTS

| | | | | |
|---|---|---|---|---|
| 6,006,712 A * | 12/1999 | Suzuki | ............. | F02M 35/10262 123/184.53 |
| 6,530,984 B2 * | 3/2003 | Stuart | ................ | F02M 35/1261 96/380 |
| 6,719,078 B2 * | 4/2004 | Nakamura | ....... | F02M 35/10013 454/906 |
| 7,107,959 B2 * | 9/2006 | Kino | ................... | F02M 35/1216 181/204 |
| 7,793,757 B2 * | 9/2010 | Letourneau | ........ | F02M 35/1261 181/249 |
| 7,938,225 B2 * | 5/2011 | Cardno | .............. | F02M 35/1222 123/184.56 |
| 8,485,153 B2 * | 7/2013 | Satarino | ............. | F02M 35/1272 181/258 |
| 8,511,428 B2 * | 8/2013 | Tange | ................ | F02M 35/1277 181/227 |
| 10,233,879 B2 * | 3/2019 | Kawazumi | ......... | F02M 35/1255 |
| 10,519,904 B2 * | 12/2019 | Cho | ................... | F02M 35/1261 |
| 11,614,058 B1 * | 3/2023 | Yang | .................. | F02M 35/0216 123/184.57 |

FOREIGN PATENT DOCUMENTS

| | | |
|---|---|---|
| JP | H04-027154 A | 3/1992 |
| JP | 2003-165470 A | 6/2003 |
| KR | 100893659 B1 | 4/2009 |

OTHER PUBLICATIONS

Patent Cooperation Treaty, WOSA, Application No. PCT/JP2021/001934, dated Apr. 1, 2021, in 6 pages.

\* cited by examiner

INTAKE NOISE REDUCTION STRUCTURE FOR VEHICLE

TECHNICAL FIELD

The present disclosure relates to an intake noise reduction structure for a vehicle.

BACKGROUND ART

Patent Literature 1 discloses a state in which a cab mount bracket is provided on a rear arch fixed to a vehicle body side, a cab mount rubber is mounted on the cab mount bracket, and a rear end of a floor frame on a cab side is elastically supported by the cab mount rubber.

CITATION LIST

Patent Literature

Patent Literature 1: JP-A-2003-165470

SUMMARY OF THE INVENTION

Technical Problem

In order to increase rigidity of a bracket fixed to a vehicle body side for mounting a predetermined component such as the cab mount bracket of Patent Literature 1, the bracket may be formed in a U-shaped cross section. In this case, an internal space of the bracket tends to be a dead space.

An object of the present disclosure is to provide an intake noise reduction structure for a vehicle, which can effectively utilize the internal space of the bracket.

Solution to Problem

A first aspect of the present disclosure relates to an intake noise reduction structure for a vehicle to reduce intake noise of an intake duct which takes air into an engine, and includes a bracket, a resonator, and a ventilation passage. The bracket has a U-shaped cross section in which a pair of facing plate portions extend from both side edges of a bottom plate portion so as to face each other, and is fixed to a vehicle body side for mounting a predetermined component. The bottom plate portion and the pair of facing plate portions partition a bracket inner space, and the bottom plate portion is provided with a through hole which makes the bracket inner space communicate with an outside. A resonator is fixed to the bracket in a state where the resonator is accommodated in the bracket inner space. A ventilation passage makes the resonator communicate with the intake duct through the through hole.

A second aspect of the present disclosure relates to the intake noise reduction structure according to the first aspect, and the vehicle is a cab-over type vehicle in which a front end side of a cab is supported to be tiltable about a tilt axis with respect to a vehicle body frame. The cab includes a pair of left and right supported members which are fixed to a front lower end portion or a rear lower end portion. The predetermined component is at least one of a pair of left and right cab mounts provided on the vehicle body side to support the pair of left and right supported members. The bracket is a cab mount bracket which is fixed to the vehicle body frame to mount the cab mount.

In the configuration described above, since the intake duct communicates with the resonator through the ventilation passage, the intake noise of the intake duct can be reduced by the resonator.

Since the resonator is accommodated in the bracket inner space, the bracket inner space (internal space of the bracket), which tends to be a dead space, can be effectively utilized. In addition, the resonator can be protected by the bottom plate portion and the pair of facing plate portions.

Advantageous Effects of Invention

According to the intake noise reduction structure of the present disclosure, the internal space of the bracket can be effectively utilized.

DESCRIPTION OF EMBODIMENTS

Hereinafter, an embodiment of the present disclosure will be described with reference to the drawings. In the figure, FR indicates a front of a vehicle, UP indicates an upper side of the vehicle, and IN indicates an inside in a vehicle width direction. In the following description, a left-right direction means a left-right direction in a state of facing the front of the vehicle.

Figure 1:
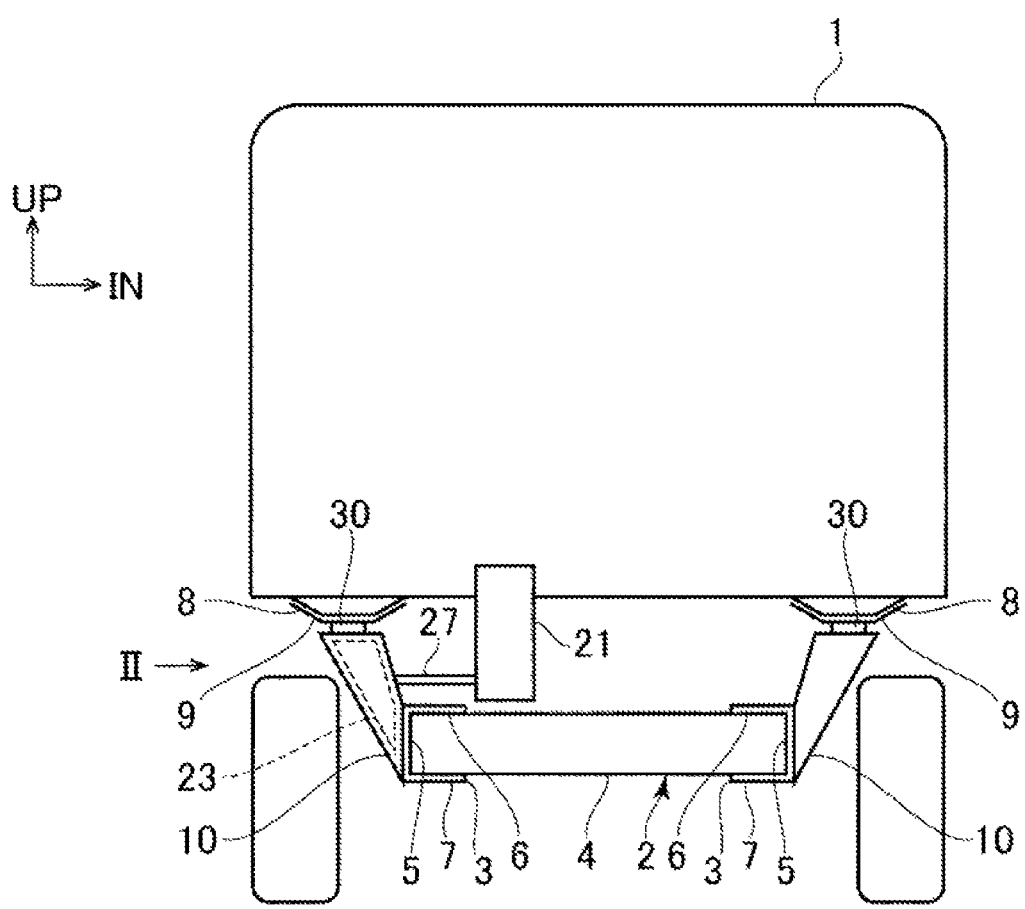
FIG. 1 is a front view of a vehicle provided with an intake noise reduction structure according to an embodiment of the present disclosure.

The vehicle illustrated in FIG. 1 is a cab-over truck (cab-over type vehicle) in which a front end side of a cab 1 is supported to be tiltable about a tilt axis (not illustrated) with respect to a vehicle body frame 2. The vehicle body frame 2 is composed of a pair of left and right side members 3 extending in a front-rear direction of the vehicle and a plurality of cross members 4 extending in the vehicle width direction to connect the left and right side members 3. The side member 3 has a U-shaped cross section that opens inward in the vehicle width direction. The side member 3 integrally has a vertical wall portion 5 intersecting with the vehicle width direction, and an upper wall portion 6 and a lower wall portion 7 extending inward in the vehicle width direction facing each other from upper and lower end edges of the vertical wall portion 5. FIG. 1 illustrates only the cross member 4 at a front end of the vehicle.

A pair of left and right supported members 8 are fixed to a front lower end portion of the cab 1, and a pair of left and right cab block brackets (not illustrated) are fixed to a rear lower end portion of the cab 1 as supported members on a rear side. A pair of left and right front cab mounts 9 are fixed to the vehicle body frame 2 side corresponding to left and right supported members 8 on a front side, and a pair of left and right rear cab mounts (not illustrated) are fixed corresponding to left and right cab lock brackets on the rear side. Inside the cab lock bracket, a cab lock device (not illustrated) that can be locked by engaging with a striker (not illustrated) of the rear cab mount is provided. When the cab 1 is tilted (lowering a rear end of the cab 1) from a tilted state to a non-tilted state, the left and right supported members 8 are placed on the left and right front cab mounts 9 on the front side, and the left and right cab lock brackets are placed on the left and right rear cab mounts on the rear side, and further the striker engages with the left and right cab lock devices. By engagement of the cab lock device and the striker, a rear end side of the cab 1 in the non-tilted state is locked to the vehicle body frame 2 side. The left and right front cab mounts 9 are respectively elastically supported by left and right cab mount brackets 10 via elastic bodies 30, and the left and right cab mount brackets 10 are respectively fixed to the left and right side members 3.

An example of the present embodiment is a front intake specification, and an intake duct 21 for taking air into an engine (not illustrated) of the vehicle is provided between the left and right cab mount brackets 10 and on a right side (inside (left side) in the vehicle width direction of cab mount bracket 10 on the right side) of a center in the vehicle width direction of the vehicle. The engine is arranged below the cab 1, and the engine and the intake duct 21 are fixed to the vehicle body frame 2, respectively. The intake duct 21 extends in an up-down direction on a front surface side of the cab 1 and has an intake port (not illustrated) in an upper portion of the intake duct 21. The air flowing in from the intake port flows from above to below in the intake duct 21 and is supplied to the engine from a lower end portion of the intake duct 21 via an intake connection pipe (not illustrated).

Figure 2:
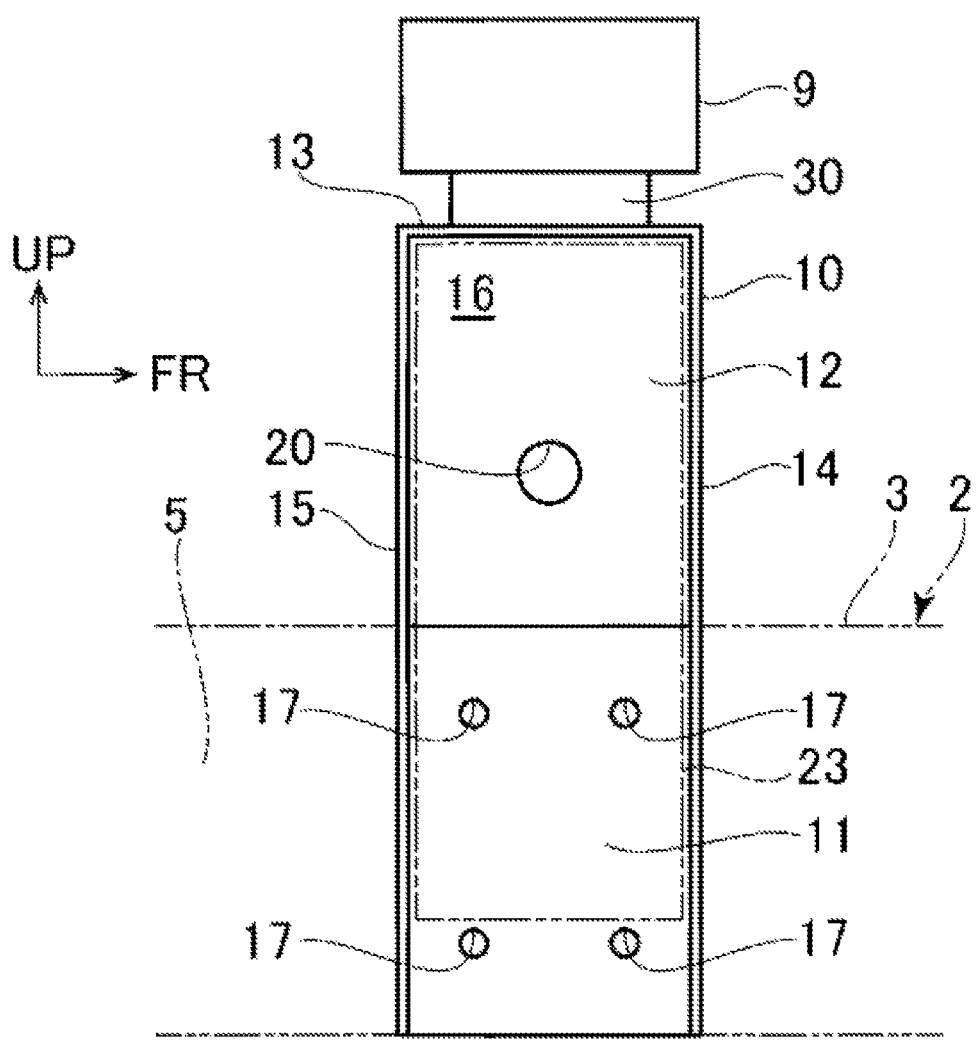
FIG. 2 is a side view of a cab mount bracket on a right side of FIG. 1 as viewed from an outside (direction of arrow II) in a vehicle width direction.
Figure 3:
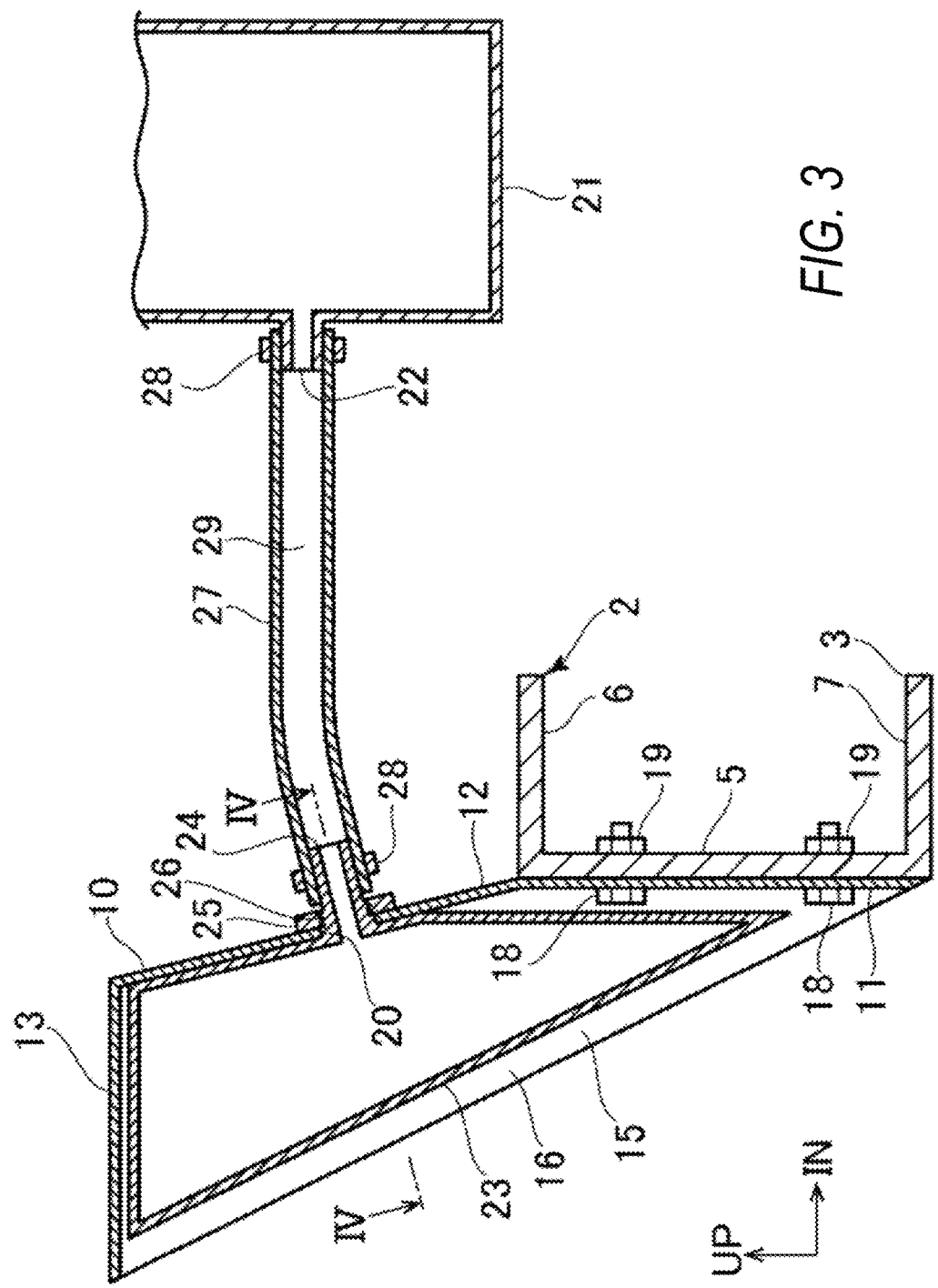
FIG. 3 is a cross-sectional view of the intake noise reduction structure of FIG. 1.
Figure 4:
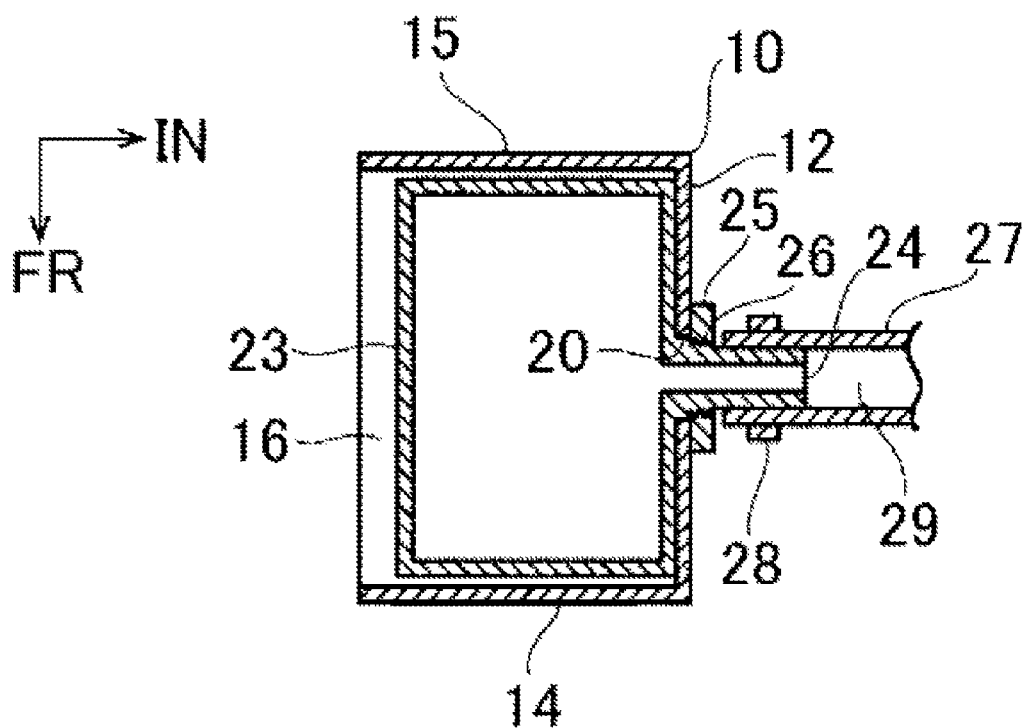
FIG. 4 is a cross-sectional view taken along a line IV-IV of FIG. 3.

As illustrated in FIGS. 2 to 4, the cab mount bracket 10 integrally has a fixing plate portion 11 which overlaps and is fixed to the vertical wall portion 5 of the side member 3 from the outside in the vehicle width direction, an inclined plate portion 12 extending from an upper end edge of the fixing plate portion 11 so as to be inclined outward and upward in the vehicle width direction, a mount support plate portion 13 extending outward in the vehicle width direction from an upper end edge of the inclined plate portion 12, a front plate portion 14 extending outward in the vehicle width direction from front end edges of the fixing plate portion 11 and the inclined plate portion 12, and a rear plate portion 15 extending outward in the vehicle width direction from rear end edges of the fixing plate portion 11 and the inclined plate portion 12. An upper end edge of the front plate portion 14 is continuous with a front end edge of the mount support plate portion 13, and an upper end edge of the rear plate portion 15 is continuous with a rear end edge of the mount support plate portion 13, and further the front plate portion 14 and the rear plate portion 15 are separated from each other in the front-rear direction and face each other. The mount support plate portion 13 is arranged substantially horizontally, and the front cab mount 9 is placed and fixed on an upper surface of the mount support plate portion 13 via the elastic body 30.

In this way, the cab mount bracket 10 of the present embodiment has a U-shaped cross section in which a pair of facing plate portions (front plate portion 14 and rear plate portion 15) extend from both side edges (front end edge and rear end edge) of the bottom plate portion (inclined plate portion 12) so as to face each other, and the cab mount bracket 10 forms a bracket fixed to the vehicle body side for mounting a predetermined component (front cab mount 9). The inclined plate portion 12, the front plate portion 14, and the rear plate portion 15 partition a bracket inner space 16 together with the fixing plate portion 11 and the mount support plate portion 13.

In the vertical wall portion 5 of the side member 3 and the fixing plate portion 11 of the cab mount bracket 10, a plurality of (in the present embodiment, four locations on the front, rear, left, and right) bolt insertion holes 17 penetrating in the vehicle width direction are formed in a state where the fixing plate portion 11 is overlapped with the vertical wall portion 5 from the outside in the vehicle width direction. By overlapping the fixing plate portion 11 with the vertical wall portion 5 from the outside in the vehicle width direction, inserting bolts 18 into the bolt insertion holes 17, and screwing and tightening the bolts 18 and nuts 19, the fixing plate portion 11 is fastened and fixed to the side member 3.

The inclined plate portion 12 of the cab mount bracket 10 on the right side is formed with a through hole 20 with a circular shape which makes the bracket inner space 16 communicate with the outside (inside of the inclined plate portion 12 in the vehicle width direction). An inner diameter of the through hole 20 is set to be slightly larger than an outer diameter of a resonator-side connection pipe portion 24 described below, and the resonator-side connection pipe portion 24 is inserted into the through hole 20.

A duct-side connection pipe portion 22 is integrally provided at a lower portion of the intake duct 21. The duct-side connection pipe portion 22 has a circular pipe shape protruding from an outer peripheral surface of the intake duct 21, and makes the inside of the intake duct 21 communicate with the outside.

In the left and right cab mount brackets 10, a resonator (resonant box) 23 is accommodated in the bracket inner space 16 of the cab mount bracket 10 on the right side near the intake duct 21. A shape, an internal structure, a material, and the like of the resonator 23 can be freely set. The through hole 20 may be provided in the cab mount bracket 10 on the left side, and the resonator 23 may be accommodated in the bracket inner space 16 of the cab mount bracket 10 on the left side.

The resonator 23 is integrally provided with the resonator-side connection pipe portion 24. The resonator-side connection pipe portion 24 has a circular pipe shape which protrudes from an outer surface of the resonator 23, and makes a closed space inside the resonator 23 communicate with the outside. A male screw 26 which can be screwed with a nut 25 is formed on an outer peripheral surface of an intermediate portion of the resonator-side connection pipe portion 24. By inserting a tip of the resonator-side connection pipe portion 24 into the through hole 20 of the inclined plate portion 12 of the cab mount bracket 10 from the outside in the vehicle width direction, and screwing and tightening the nut 25 onto the male screw 26 from the inside in the vehicle width direction, the resonator 23 is fixed to the cab mount bracket 10 in a state where the resonator 23 is accommodated in the bracket inner space 16.

Both the intake duct 21 and the resonator 23 are made of resin and are connected by a resonator connection pipe 27. The resonator connection pipe 27 is composed of, for example, a rubber tube having an inner diameter slightly smaller than an outer diameter of each of the duct-side connection pipe portion 22 and the resonator-side connection pipe portion 24. By pressing and inserting the duct-side connection pipe portion 22 and the resonator-side connection pipe portion 24 into both end portions of the resonator connection pipe 27, respectively, and tightening outer peripheries of both end portions of the resonator connection pipe 27 of which diameters are expanded by elastic deformation with binding bands 28 or the likes, both end portions of the resonator connection pipe 27 are fixed to the connection pipe portions 22 and 24. The duct-side connection pipe portion 22, the resonator-side connection pipe portion 24, and the resonator connection pipe 27 form a ventilation passage 29 which makes the resonator 23 communicate with the intake duct 21 through the through hole 20. The intake duct 21 and the resonator 23 are not limited to those made of resin, and the resonator connection pipe 27 is not limited to those made of rubber.

According to the present embodiment, since the intake duct 21 communicates with the resonator 23 via the ventilation passage 29, the intake noise of the intake duct 21 can be reduced by the resonator 23.

Since the resonator 23 is accommodated in the bracket inner space 16, the bracket inner space 16 (internal space of the cab mount bracket 10), which tends to be a dead space, can be effectively utilized.

Since the resonator 23 is covered by each plate portion (fixing plate portion 11, inclined plate portion 12, mount support plate portion 13, front plate portion 14, and rear plate portion 15) of the cab mount bracket 10, the resonator 23 can be protected by the cab mount bracket 10.

Since the resonator 23 is fixed to the cab mount bracket 10 by tightening the nut 25 to the male screw 26 of the resonator-side connection pipe portion 24, assembly work of the resonator 23 can be easily performed.

Although the present disclosure is described above based on the above-described embodiment, the present disclosure is not limited to the contents of the above-described embodiment, and can be appropriately changed without departing from the present invention. That is, it goes without saying that all other embodiments, examples, operational techniques, and the like made by those skilled in the art based on this embodiment are included in the scope of the present invention.

For example, in the embodiment described above, the case of the front intake specification is described, but the intake duct 21 may have a rear intake specification extending in the up-down direction on a rear surface side of the cab 1. In this case, the resonator 23 may be accommodated in a bracket inner space of a cab mount bracket on the rear side which supports a rear cab mount.

An internal space of a bracket fixed to the vehicle body side for mounting a predetermined component other than the cab mount bracket 10 may be utilized as an accommodation space of the resonator 23.

This application is based on Japanese patent application filed on Jan. 24, 2020 (Patent Application No. 2020-009792), the contents of which are incorporated herein by reference.

INDUSTRIAL APPLICABILITY

The present disclosure is applicable to a vehicle equipped with a bracket which is fixed to a vehicle body side for mounting a predetermined component.

LIST OF REFERENCE NUMERALS 1 cab
2 vehicle body frame
3 side member
4 cross member
5 vertical wall portion
6 upper wall portion
7 lower wall portion
8 supported member
9 front cab mount (predetermined component)
10 cab mount bracket (bracket)
11 fixing plate portion
12 inclined plate portion (bottom plate portion)
13 mount support plate portion
14 front plate portion (facing plate portion)
15 rear plate portion (facing plate portion)
16 bracket inner space
17 bolt insertion hole
18 bolt
19, 25 nut
20 through hole
21 intake duct
22 duct-side connection pipe portion
23 resonator
24 resonator-side connection pipe portion
26 male screw
27 resonator connection pipe
28 binding band
29 ventilation passage
30 elastic body

The invention claimed is:

1. An intake noise reduction structure for a vehicle to reduce intake noise of an intake duct which takes air into an engine, the structure comprising:
   a bracket having a U-shaped cross section in which a pair of facing plate portions extend from both side edges of a bottom plate portion so as to face each other, wherein the bottom plate portion and the pair of facing plate portions partition a bracket inner space, and the bottom plate portion is provided with a through hole which makes the bracket inner space communicate with an outside of the bracket inner space, the bracket being fixed to a vehicle body side for mounting a predetermined component;
   a resonator fixed to the bracket in a state where the resonator is accommodated in the bracket inner space; and
   a ventilation passage making the resonator communicate with the intake duct through the through hole.

2. The intake noise reduction structure according to claim 1,
   wherein the vehicle is a cab-over type vehicle in which a front end side of a cab is supported to be tiltable about a tilt axis with respect to a vehicle body frame,
   the cab includes a pair of left and right supported members which are fixed to a front lower end portion or a rear lower end portion,
   the predetermined component is at least one of a pair of left and right cab mounts provided on the vehicle body side to support the pair of left and right supported members, and
   the bracket is a cab mount bracket which is fixed to the vehicle body frame to mount the cab mount.

* * * * *